United States Patent [19]

Mercer

[11] Patent Number: 4,574,100
[45] Date of Patent: Mar. 4, 1986

[54] PLASTICS MATERIAL MESH STRUCTURE

[75] Inventor: Frank B. Mercer, Blackburn, England

[73] Assignee: P.L.G. Research Limited, Blackburn, England

[21] Appl. No.: 674,724

[22] Filed: Nov. 26, 1984

Related U.S. Application Data

[63] Continuation of Ser. No. 363,447, Mar. 30, 1982, abandoned.

[30] Foreign Application Priority Data

Apr. 3, 1981 [GB] United Kingdom ............... 8110472

[51] Int. Cl.$^4$ .................. B29C 17/02; B32B 3/24
[52] U.S. Cl. ..................... 428/134; 428/135; 428/136; 428/255; 428/910; 264/288.8; 264/DIG. 81
[58] Field of Search ............ 428/131, 134, 135, 136, 428/910, 156, 255; 264/DIG. 81, 288.8, 291, 290.2

[56] References Cited

U.S. PATENT DOCUMENTS

| | | | |
|---|---|---|---|
| 3,384,530 | 5/1968 | Mercer et al. | 428/135 |
| 3,386,876 | 6/1968 | Wyckoff. | |
| 3,616,154 | 10/1971 | Dow et al. | |
| 3,666,609 | 5/1972 | Kalwaites et al. | 428/134 |
| 4,123,491 | 10/1978 | Larsen. | |
| 4,303,714 | 12/1981 | Mercer | 428/134 X |

FOREIGN PATENT DOCUMENTS

| | | |
|---|---|---|
| 94251 | 12/1972 | German Democratic Rep. . |
| 969205 | 9/1964 | United Kingdom . |
| 1075487 | 7/1967 | United Kingdom . |
| 1116181 | 6/1968 | United Kingdom . |
| 1170639 | 11/1969 | United Kingdom . |
| 1372782 | 11/1974 | United Kingdom . |
| 2035191 | 6/1980 | United Kingdom . |
| 2073090 | 10/1981 | United Kingdom . |

Primary Examiner—Alexander S. Thomas
Attorney, Agent, or Firm—Holman & Stern

[57] ABSTRACT

Plastics material mesh structures are made by providing a starting material having a pattern of primary holes or depressions and smaller secondary holes or depressions between the primary holes or depressions and stretching the plastics material to orientate the zones between adjacent holes or depressions to form orientated strands. A first stretch in a single direction produces intermediate structures having first mesh openings and smaller second mesh openings. A subsequent stretch at right angles to the first stretch produces structures having main orientated strands interconnected by shorter orientated strands arranged in such a way that only three strands meet at any junction.

19 Claims, 75 Drawing Figures

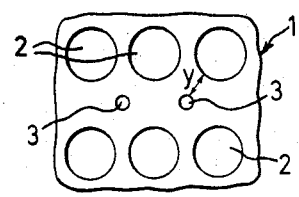
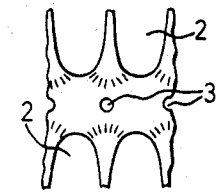
FIG.9a.     FIG.9b.
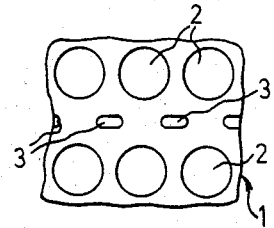
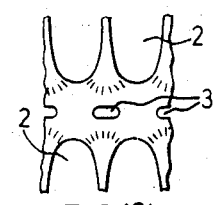
FIG.10a.     FIG.10b.
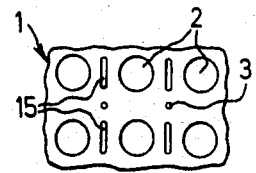
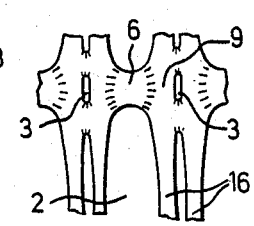
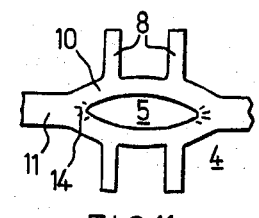
FIG.11a.     FIG.11b.     FIG.11c.
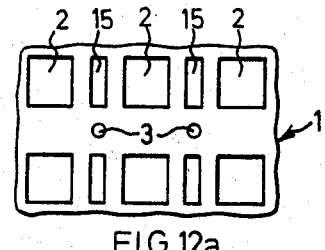
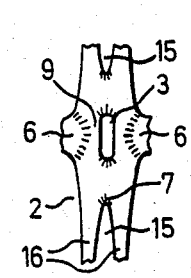
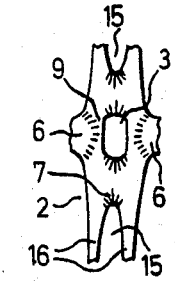
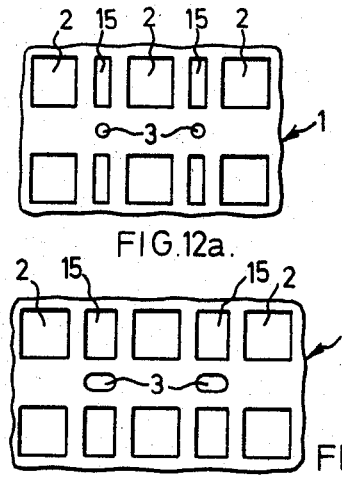
FIG.12a.     FIG.12b.     FIG.13b
FIG.13a.

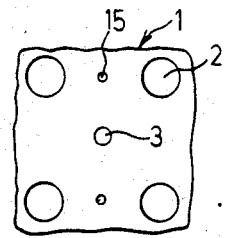
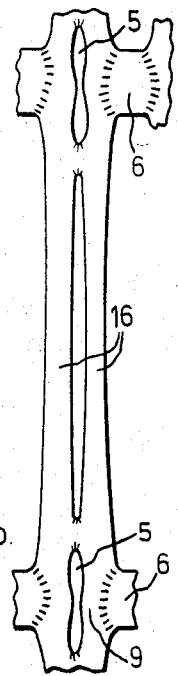
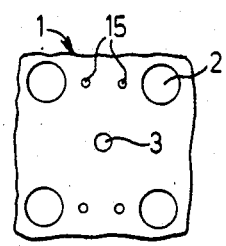
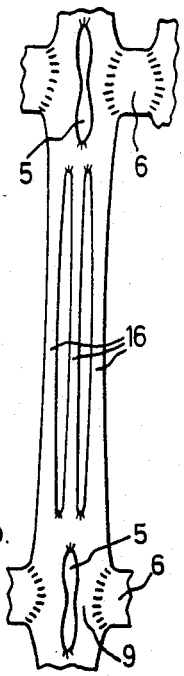
FIG.14a.  FIG.14b.  FIG.15a.  FIG.15b.
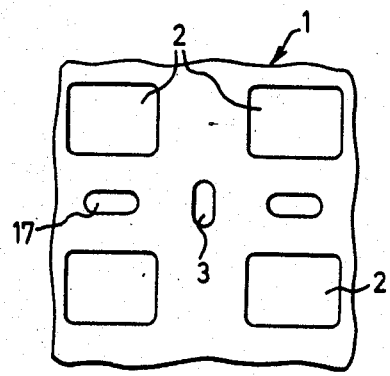
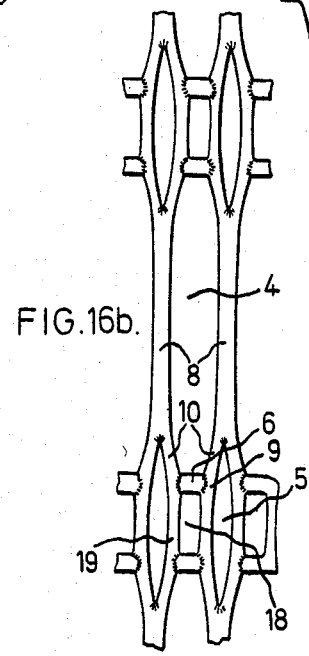
FIG.16a.  FIG.16b.

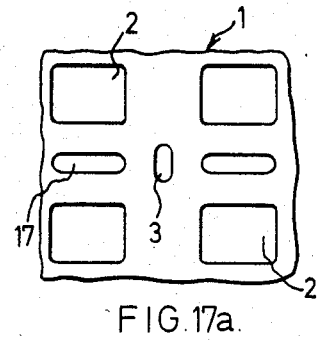
FIG.17a.
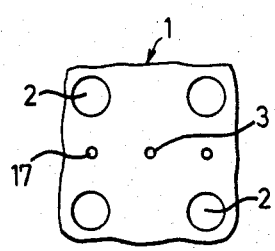
FIG.18a.
FIG.18b.
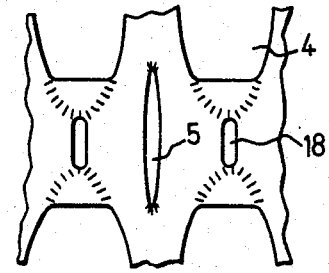
FIG.19a.
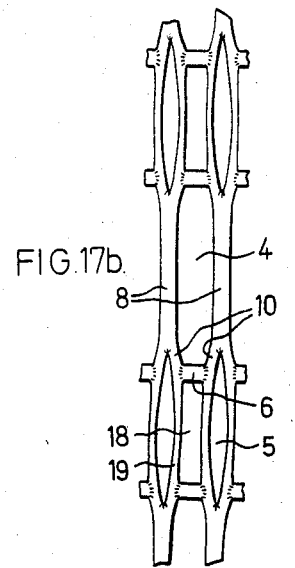
FIG.17b.
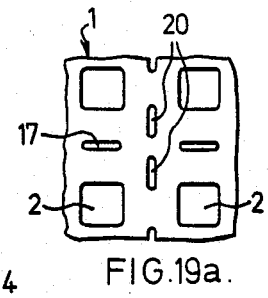
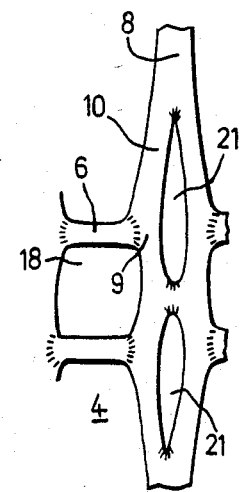
FIG.19b.

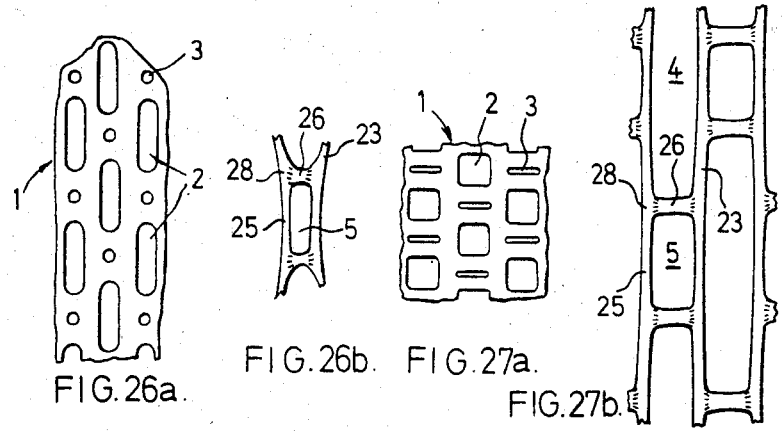
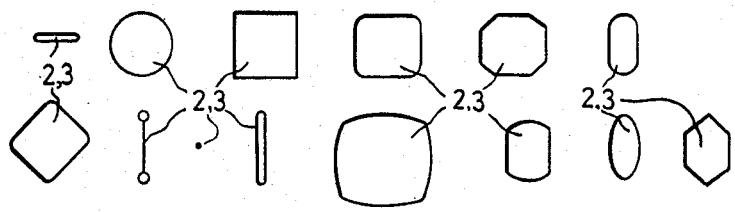
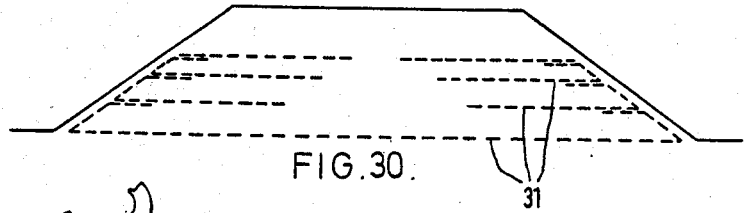
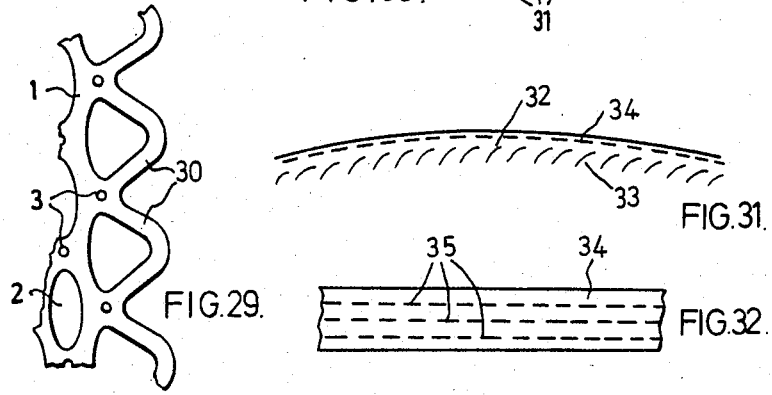

PLASTICS MATERIAL MESH STRUCTURE

This is a continuation of application Ser. No. 363,447, filed Mar. 30, 1982, now abandoned.

DEFINITIONS

The term "substantially uniplanar" can include material exhibiting some biplanar characteristics such as integrally extruded net where the strand central axes lie in two planes separated by about 50% of the strand depth.

The term "rectangular" includes square.

The term "parallelogram" includes rhombus-shaped, rectangular and square.

The term "smaller" when referred to the openings or recesses means that the periphery is of shorter length.

The term "orientated" means molecularly orientated. In general, when an orientated strand is referred to, the preferred direction of orientation is longitudinally of the strand.

The terms "uniax" and "biax" mean uniaxially-stretched and biaxially-stretched, respectively.

The terms "N-S" and "E-W" mean "north-south" and "east-west" and normally correspond to the first and second directions, which are also referred to. These terms are used for convenience to denote two directions at right angles on a starting material or mesh structure. Where "E-W rows" are referred to, the rows are those which extend in the E-W direction although the individual strands in an E-W row would themselves extend N-S. If a stretching operation is being described, the first effective stretch is in the N-S direction and the second effective stretch (if any) is usually in the E-W direction. However, these directions are only notional, and the actual directions on a production machine can be chosen as suitable—for example the N-S direction can be machine direction (MD), transverse direction (TD), or any other suitable direction.

The terms "thick", "thin" and "thickness", refer to the dimension normal to the plane of the material or mesh structure and the term "width" refers to the appropriate dimension in the plane of the material or mesh structure. The thickness of the starting material or of the mesh structure is the distance between the extreme faces of the material or mesh structure. The thickness or depth of a strand is the thickness of the strand cross-section, but ignoring raised edges. Particularly if the original holes or depressions have no radiussing where they issue at the faces of the sheet, the strands will have a "pin-cushion" cross-section, with raised edges and lower centres; the thickness or depth will be as measured inwardly of the raised edges.

Stretch ratios are either given overall or "on the strands". If they are given on the strands, they are measured by measuring the distance moved by the respective ends of the openings on either side of the strand. The ratios are as measured after relaxation. "PP" is polypropylene and "HDPE" is high density polyethylene.

The depressions are not necessarily formed by the application of pressure.

BACKGROUND OF THE INVENTION

The present invention relates to integral plastics material mesh structures and methods of producing the structures. GB No. 2 035 191A and GB No. 2 073 090A describe first generation mesh structures, which are respectively biax and uniax. Although the first generation structures have been successful commercially, it is possible to improve their properties. For instance, orientated PP has very good properties at low temperatures, but is very susceptible to cracking or splitting if bent along bend lines running parallel to the orientation; increasing the stretch ratio in HDPE structures improves the physical properties, but stretch ratios on the strands in excess of around 8:1 gives the same cracking or splitting problem. Furthermore, it is desirable to increase the tensile strength, the Young's modulus, the resistance to long term creep and rupture, the relative stiffness and the tensile force per meter width per kilogram; the latter is a good parameter for measuring mesh structures for many uses where high strength is required, particularly in just one direction.

THE INVENTION

The present invention provides a biax structure having a pattern of generally octagonal first openings and second openings which are substantially smaller than the first openings, each opening being bounded essentially by a plurality of orientated strands which are interconnected at respective junctions at substantially each of which only three strands meet, and the crotches between the strands at the junctions being orientated in the direction running around the crotch. The biax structure can be made by a method in which the starting material is substantially uniplanar and comprises a regular pattern of primary holes or depressions, and, between the primary holes or depressions, secondary holes or depressions which are substantially smaller than the primary holes or depressions. The plastics material is stretched to draw out and orientate the zones between adjacent holes or depressions to form the orientated strands.

The present invention also provides a "square form" uniax structure comprising:

rows of generally parallel, spaced, orientated first strands, substantially each first strand extending generally in a first direction and said rows extending generally in a second direction at right angles to said first direction, the first strands of one row being generally aligned with the respective first strands of the next row;

orientated second strands, each end of each first strand forking into a pair of second strands; and rows of interconnecting portions comprising either unorientated zones or zones which are substantially less orientated than the mid-points of the first strands, said rows extending generally in said second direction, each interconnecting portion being generally aligned in said first direction with a first opening formed between two first strands, and respective ends, in said second direction, of the interconnecting portions merging with the ends, in said first direction, of two second strands which fork from two adjacent first strands of the same row, the respective ends of each interconnecting portion also being connected to two second strands which in turn fork from two first strands of the next row of first strands;

the first openings being bounded essentially by two adjacent first strands of the same row, two interconnecting portions of adjacent rows of interconnecting portions and four second strands forking from the ends of the two first stands, and second openings being formed in general alignment with respective first strands in said first direction, bounded in part by a pair of second strands which fork from the end of the same first strand.

The present invention further provides uniax "diamond form" structures comprising:

orientated first strands;

rows of generally parallel, spaced, orientated second strands, substantially each second strand extending generally in a first direction and said rows extending generally in a second direction at right angles to said first direction, the respective second strands of alternate rows being generally aligned with one another; and rows of interconnecting portions which comprise unorientated zones or zones which are substantially less orientated than the mid-points of the first strands, said rows extending generally in said second direction, and respective ends, in said second direction, of the interconnecting portions merging with the ends, in said first direction, of adjacent second strands in any one row, and adjacent second strands in the same row interconnecting the ends, in said second direction, of two interconnecting portions in adjacent rows which are generally aligned in said first direction, thereby forming second openings each bounded essentially by two interconnecting portions and two second strands, the second openings so formed being in rows which extend generally in said second direction, the second openings of alternate rows of second openings being generally aligned with one another in said first direction and the respective second openings of successive rows of second openings being staggered as considered in said first direction, and respective ends, in said first direction, of each first strand merging with the ends of two interconnecting portions of adjacent rows of interconnecting portions, which interconnecting portions are staggered as considered in said first direction, thereby forming first openings bounded essentially by two pairs of first strands, a pair of second strands in the same row, the ends of four interconnecting portions from adjacent rows of interconnecting portions and two interconnecting portions from the next rows of interconnecting portions on either side of the first-mentioned rows of interconnecting portions.

The uniax "square form" and "diamond form" structures are in general made from similar starting materials. The starting materials are substantially uniplanar and comprise a regular pattern of primary holes or depressions, and between the primary holes or depressions, secondary holes or depressions which are smaller than the primary holes or depressions. The normal starting material for the uniax "square form" structure has the primary holes or depressions on a rectangular grid, and the starting material is stretched in a direction substantially parallel to a side of the grid. Such starting materials are referred to colloquially as "square form" starting materials, and are referred to as such in the specification, the structures produced from the starting materials being referred to as "square form" structures. The normal starting material for the uniax "diamond form" structure has the primary holes or depressions on a parallelogram grid, and the starting material is stretched in a direction substantially parallel to a diagonal of the grid. Such starting materials are referred to colloquially as "diamond form" starting materials, and are referred to as such in the specification, the structures produced from the starting materials being referred to as "diamond form" structures.

Biax Structures of the Invention

The provision of only three strands at each junction gives good tear strength and impact strength at each junction, and the structures can be arranged so that they rupture across the strands and not at the junctions, indicating that the junctions are stronger than the strands. The crotches bordering the primary and secondary openings can all be orientated, thereby ensuring that there is a ring of orientated material around all the mesh openings; the whole structure is then made up of rings of orientated material, which can be very highly orientated if desired, interconnected by junctions at which only three strands meet. However, although each crotch between adjacent strands can be orientated in the direction running round the crotch, there can be in the crotch a zone of plastics material which is substantially less orientated than the mid-points of the strands which meet at the crotch, because such a zone impedes the initiation of a tear at the crotch. The junctions themselves can be merely continuations of the strands, i.e. having no substantial area of their own except for radiussing between adjacent strands, or may be in the form of triangular widenings.

The biax mesh structures can be suitable for a number of uses. It is particularly suitable for very light weight structures, such as garden netting, and can have a good appearance. However, heavier structures can be provided, for instance for fishing nets or even of sufficient strength to be used as stock fencing. One use of the biax square form structures is as asphalt reinforcing; the structure is preferably unbalanced with the direction of higher orientation transverse of traffic movement. For asphalt reinforcing, the highest possible tensile figures are required in the transverse direction to prevent rutting, but there should be sufficient strength in the direction of traffic movement to prevent the mesh structure breaking up.

Uniax Square Form Structures of the Invention

The uniax square form structures can have high strength in the direction of the strands with continuous orientated material extending from one end of the structure to the other. Compared to the uniax structure of GB No. 2 073 090A, the uniax square form structures of the invention can be orientated to a much greater degree by applying much greater overall stretch ratios, can have lower unit weights, higher tensile strengths, greater creep resistance and straighter load/extension curves. A great advantage is that the E-W bars in GB No. 2 073 090A are interrupted, there being no continuous E-W parts extending across the structure. Thus the structure can be folded N-S without folding unorientated material (which is very difficult) or folding orientated material along fold lines parallel to the orientation; the folding occurs normally by bending the second strands at a large angle to the orientation, which does not greatly risk splitting the second strands. Thus the mesh structure can be highly orientated without a great risk of splitting, and can be roughly handled in use and laid on stony ground without a great danger of the mesh structure breaking up due to N-S folding or shear forces in the N-S direction.

Another use for the uniax square form structures is for strengthening or reinforcing cement or concrete to form composites. Cement is defined as a mixture formed of actual cement and an aggregate not exceeding 5 mm in particle size, which aggregate could be for instance sand, fly ash or limestone powder. Concrete is a mixture formed of actual cement, an aggregate as above and a larger aggregate which can be up to 20 mm in particle size. The mesh structure can have a stiffness of the order of the matrix, and thus can be used not only as a crack control material but also as a reinforcement material, provided its modulus is high enough. In particular, as a crack-control material, the mesh structures can perform as well as steel, and have the advantage that they do not corrode and so can be nearer outer faces of the cement or concrete. Furthermore, they are particularly useful in situations where the cement or concrete must resist explosions or heavy impacts.

The uniax square mesh structures can also be used for embankment and cutting stabilisation. In this connection, the structure can provide good tensile strength properties per unit width per unit weight, as well as good rupture and creep properties.

Uniax Diamond Form Structures of the Invention

The uniax diamond form structures can have an excellent appearance and good tensile properties in the direction of the strands, and can thus be used for instance for sun-shading material, crop-shading nets or even embankment stabilisation.

PREFERRED EMBODIMENTS

The invention will be further described, by way of example, with reference to the accompanying drawings, of which:

FIGS. 4a to 21b show further square form starting materials and uniax structures produced therefrom, and also some biax structures produced therefrom;

FIGS. 23a to 23c show three stages in the production of the biax diamond form structure, on a larger scale, while

FIGS. 24a to 27b show various further diamond mesh starting materials and uniax structures produced therefrom as well as one biax structure produced therefrom;

FIG. 28 shows examples of holes or depression shapes for the starting materials;

FIG. 29 shows an arrangement for the edge of the starting material;

FIG. 30 is a vertical section through an embankment stabilised in accordance with the invention;

FIG. 31 is a vertical section through a road surface reinforced in accordance with the invention; and FIG. 32 is a vertical section through a cement or concrete block reinforced in accordance with the invention.

Figure 1A:
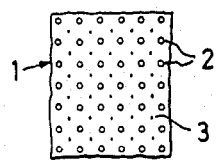
FIGS. 1a to 1d show schematically four stages in the production of a biax square form mesh structure in accordance with the invention, forming a uniax mesh structure as an intermediate product.

FIGS. 1a to 1d and 22a to 22c are schematic. FIGS. 2b, 2d, 2e, 2g, 2h, 2i, 3b, 3c, 4b, 5b, 16b, 17b, and 23b were drawn from laboratory samples, though variations were noted across the width of the sample. The remaining Figures showing uniax or biax structures are theoretical.

In the respective Figures, the lines which indicate the profile of the structure extend up and down the slope, following the line of maximum gradient, i.e. at right angles to conventional contour lines.

All the starting material shown in the drawings are strictly uniplanar, having flat, parallel faces, and the uniax and biax structures produced therefrom are strictly uniplanar.

Square Form Starting Materials and Structures

FIG. 1a shows a starting material 1 comprising a regular pattern of primary holes or depressions 2 having their centres on a notional substantially parallelogram grid, and, between the primary holes or depressions 2, secondary holes or depressions 3 having their centres on substantially the same grid but displaced along the diagonal of the grid by at least approximately half the distance between the primary holes or depressions 2 which are adjacent in the diagonal sense. Thus there is a secondary hole or depression 3 in the centre of groups of four adjacent primary holes or depressions 2. More specifically, the grid shown in FIG. 1a a square grid.

Figure 1B:
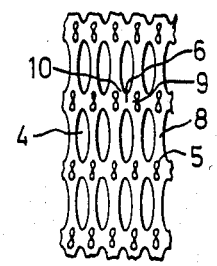

The starting material 1 is stretched N-S, i.e. in a direction parallel to a side of the grid, forming the uniax mesh structure of FIG. 1b. This uniax mesh structure is shown as having first mesh openings 4 and second mesh openings 5 which are substantially smaller.

Figure 1C:
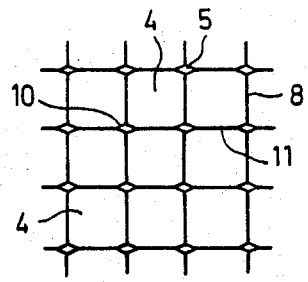
Figure 1D:
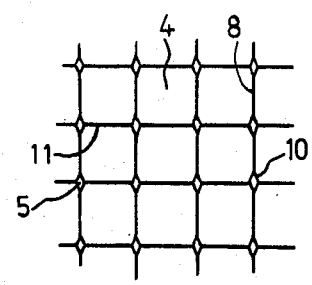

The uniax mesh structure is then stretched E-W, forming the biax mesh structure of FIG. 1c, and this biax mesh structure is then stretched again N-S, forming the biax structure of FIG. 1d.

Figure 2A:
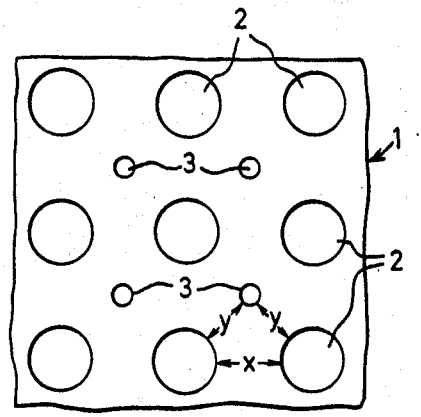
FIGS. 2a to 2c show, on a larger scale, three stages in the production of the biax structure.
Figure 2B:
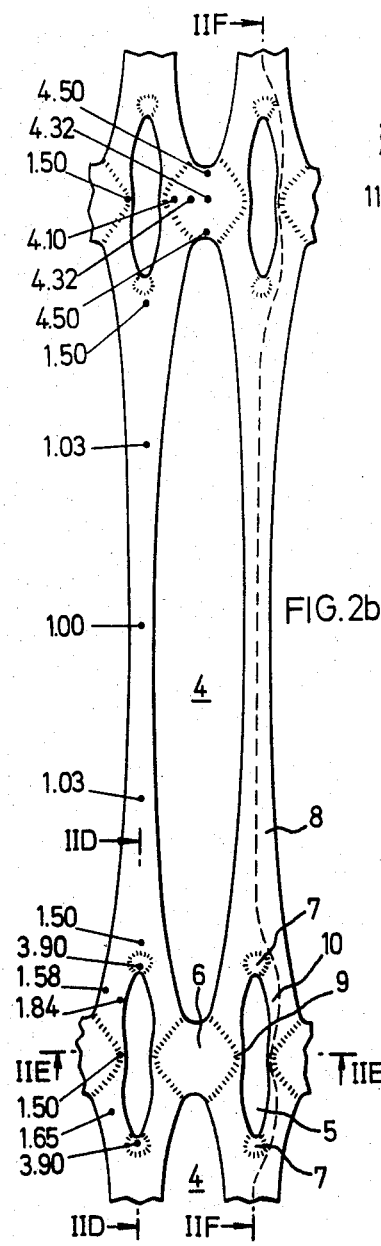

For background information on stretching plastics material to form orientated strands, GB No. 2 035 191A and GB No. 2 073 090A, mentioned above, can be referred to. However, FIG. 2b corresponds to FIG. 1b, and shows that after the first stretching operation (the exact stretching conditions are as for structure 5 of the Table below), there are zones 6 of unorientated material and further crotch zones 7 of material which is either unorientated or less orientated than that of first strands 8, the zones 6 and 7 being substantially thicker than the strands 8 and having inclined surfaces (indicated by the shade lines) where they merge with the orientated zones or the strands 8. In the specific case illustrated, the centres of the zones 6 have the thickness of the starting material. Reference can be made to FIGS. 2d and 2e for the profiles of the zones 6 and 7. Actual thicknesses at various points on FIG. 2b are shown in millimeters. The zones 7 are beneficial, acting as tear stoppers, though would not be essential in all cases. Junctions or interconnecting portions are formed by the zones 6 and the narrow orientated zones 9; the zones 9 provide the E-W ends of the interconnecting portions 6, 9. The first strands 8 are connected to the junctions by short forks, legs or second strands 10. It will be seen that the orientated zones 9 extend right through the junctions and interconnect the aligned first strands 8. The material of the transverse bars (between the rows of primary holes or depressions 2) has not only been orientated, but has in effect been pulled out to form the second strands 10, the second strands 10 being substantially shorter than the first strands 8. A relatively high stretch ratio has been applied to continuous bands of material which extend generally N-S right through the structure, a band being formed by a first strand 8, a second strand 10, a zone 9, a second strand 10, a first strand 8, and so on as indicated by the dashed line in FIG. 2b sectioned in FIG. 2f; there is a slight lump or thickening at the zones 9 but this could be drawn out by altering the starting material to have wider second strands 10. In spite of this, the structure can be flexed about an N-S bend line without great risk of cracking. On flexing, the zones 6 do not bend as they are discontinuous E-W, and the second strands 10 bend roughly at 45° to their longitudinal axes.

Figure 2C:
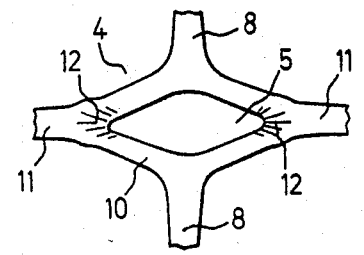
Figure 2D:
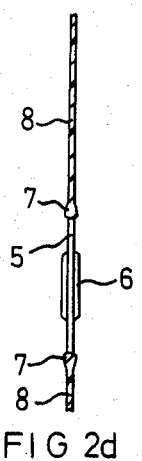
FIGS. 2d, 2e and 2g are sections along the lines IID—IID, IIE—IIE and IIF—IIF in FIG. 2b, FIGS. 2g and 2h show two alternative uniax structures.
Figure 2E:
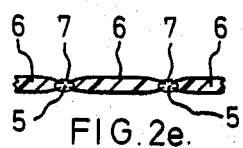
Figure 2F:
FIG. 2i shows an alternative biax structure.
Figure 2G:
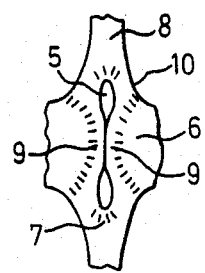
Figure 2I:
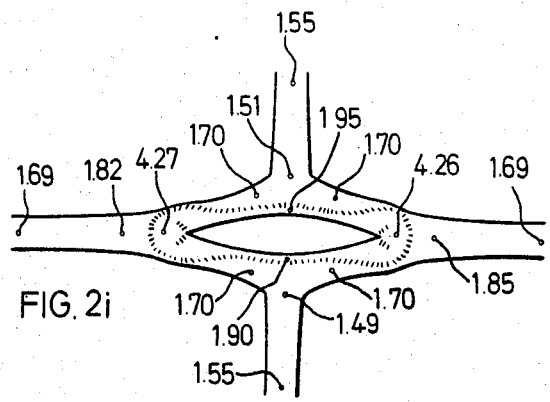
Figure 2H:
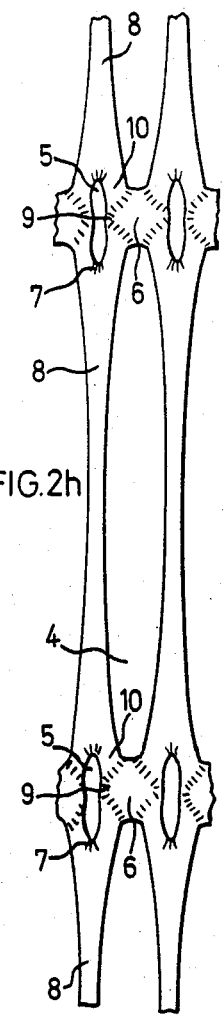

FIG. 2h shows a slightly different, HDPE, uniax mesh structure which was made from the FIG. 2a starting material, the exact conditions being as for structure 4 of the Table below. It has been found that in order to produce this structure in HDPE (high density polyethylene), an overall stretch ratio of 5:1 to 8.1, preferably 7:1 to 8:1, can be applied (the possible maximum overall stretch ratio would only be about 4.5:1 if the secondary openings or recesses 3 were not present). The centre portion of the strands 8 will have been subjected to a stretch ratio of 12:1 to 15:1.

The second strands 10 are rather shorter than in FIG. 2b caused by using HDPE instead of PP. The dashed line is taken along a band referred to above.

In FIG. 2h the second strands 10 have stretched significantly less than the first strands 8. However, substantially similar stretch ratios can be obtained on the strands 8, 10 (i.e. the strands 8, 10 can be orientated to substantially the same degree) by suitable pitching of the holes or depressions 2, 3 so that the width $x$ of the zone which forms the strands 8 (FIG. 2a) is roughly double the width of the zone $y$ which forms the strands 10; in practice it is found that $2y$ should be rather less than $x$ because of the stress being divided at the secondary hole 3.

It should be noted in respect of the uniax structure of FIG. 2b that there is a tendency to shorten in the E-W direction on stretching, and the second mesh openings 5 can decrease in width. FIG. 2g is included to show that this can occur to such an extent that the second mesh openings 5 close right up in the middle, or even become closed slits.

In general terms, the uniax structures of FIGS. 2b, 2d and 2e comprise E-W rows of spaced, orientated first strands 8, each first strand 8 extending generally in the N-S direction; the first strands 8 of one row are generally aligned with respective first strands 8 of the next row (see FIG. 2e). The structures also comprise orientated second strands 10, each end of each first strand 8 forking into a pair of second strands 10. The structures further comprise E-W rows of interconnecting portions 6, 9 comprising either unorientated zones 6 or zones 6 which are substantially less orientated than the midpoints of the first strands 8; each interconnecting portion 6, 9 is generally aligned in the N-S direction with a first mesh opening 4 formed between two first strands 8; respective E-W ends 9 of the interconnecting portion 6, 9 merge with the ends of two second strands 10 which fork from two adjacent first strands 8 of the same E-W row; the respective E-W ends 9 of each interconnecting portion 6, 9 are also connected to two second strands 10 which in turn fork from two first stands 8 of the next E-W row of first strands.

The first mesh openings 4 are bounded essentially by two adjacent first strands 8 of the same E-W row, two interconnecting portions 6, 9 of adjacent E-W rows of interconnecting portions and four second strands 10 forking from the ends of the two first strands 8. The second mesh openings 5 are formed in general alignment with respective first strands 8 in the N-S direction, bounded in part by a pair of second strands 10 which fork from the end of the same first strand 8.

FIG. 2c corresponds to FIG. 1c. The second mesh opening 5 has changed shape. The zones 6 (FIG. 2a) have been drawn out into strands 11. The zones 7 have been stretched out (either just before or just after the zones 6). The only thicker zones remaining are zones 12 at the ends of the second mesh openings 5, which, having already been orientated to form the zones 9 during the first stretching operation (FIG. 2b), will be formed of orientated material which however is not as much orientated as that of the strands 8, 11. The overall stretch ratio imparted in the second stretching operation (E-W) can be 7:1 if the overall stretch ratio was 3.1 in the first stretching operation (N-S), firstly to align the strands 10 and then to orientate, thereby stretching the strands 11 to the same stretch ratio as that of the strands 8, approximately equal stretch ratios in the strands 8, 11, or even in all the strands 8, 10 and 11, being preferred. In order to produce the biax structure of FIG. 2c as described above, there should be no restraint in the N-S direction when stretching E-W.

In general terms, the mesh structure of FIG. 2c has a pattern of generally octagonal first openings 4 and second mesh openings 5 which are substantially smaller than the first mesh openings 4 (see FIG. 1c). The sides of the first mesh openings 4 are formed alternately by orientated second strands 10 which are common to a first mesh opening 4 and to a second mesh opening 5 and by orientated strands 8, 11 which are common to two first mesh openings 4. Each mesh opening 4, 5 is bounded essentially between a plurality of orientated strands 8, 10, 11 which are interconnected at respective junctions at each of which only three strands meet.

In the N-S junctions shown in FIG. 2c, all three crotches are highly orientated in the direction running around the crotch. In the E-W junctions, two of the crotches are highly orientated in the direction running round the crotch but the third crotch is orientated to a lesser degree in the direction running around the crotch and contains the thicker, less orientated zone 12. The thicker zones 12 have been formed by the orientated E-W sides of the mesh openings 5 in FIG. 2b condensing during the E-W stretch while retaining some of the earlier orientation. The zone 12 is beneficial because it acts as a tear stopper and stops the E-W strands 11 splitting down the middle. However, the structure may be stretched again (say by up to 20%, i.e. 1.2:1, overall after stressing, without stretching, to re-align the second strands 10) in the original direction (see FIG. 1d), in order to stretch out the zones 12 and produce highly orientated plastics material whose orientation extends right round the second mesh openings or recesses 5 as well as right round the first mesh openings 4.

The biax structure of FIG. 2i was made as for that of FIG. 2c, but with less N-S restraint during the second (E-W) stretch, being near the centre of a laboratory sample. There is a more prominent E-W alignment. Thicknesses at various points are shown in millimeters.

Figure 3A:
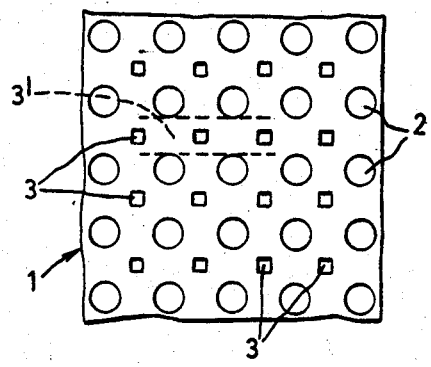
FIGS. 3a and 3b show two stages in the production of a different biax square form mesh structure, on a larger scale.
Figure 3B:
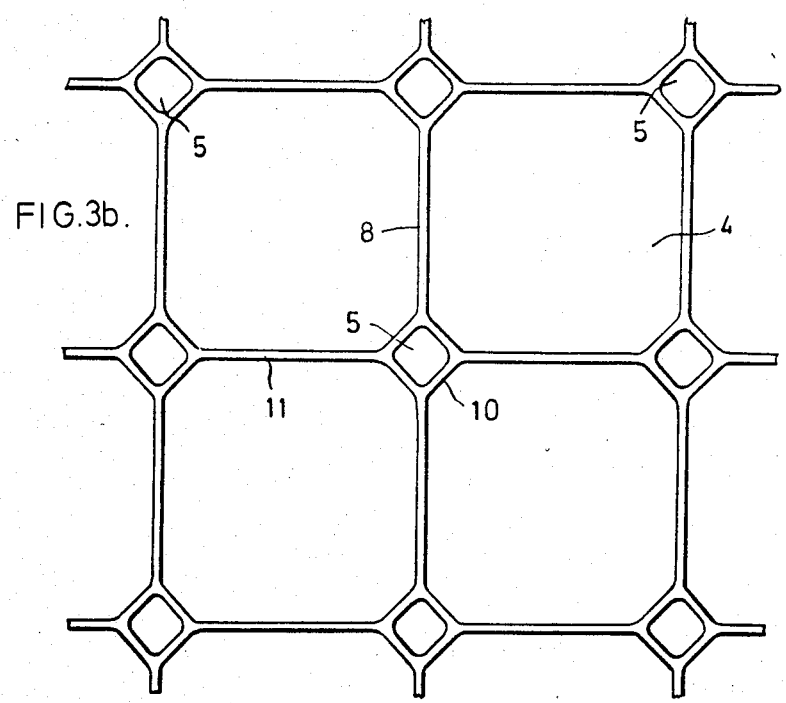
Figure 3C:
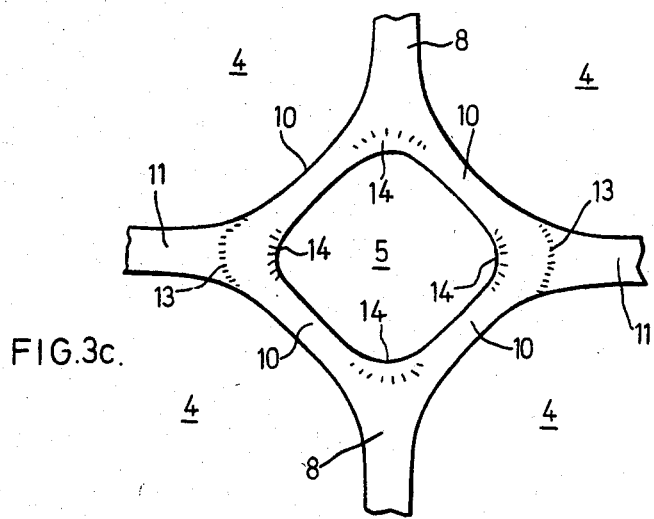
FIG. 3c shows a second mesh opening of the structure, on a yet larger scale.

FIGS. 3a and 3b correspond to FIGS. 1a and 1c or 1d, the starting material 1 being different. The second holes or depressions 3 are still substantially spaced from the edges of the respective notional zones 3' which lie between and are tangential to the rows of primary holes or depressions 2. The strands 8, 10 and 11 in FIG. 3c are not all of the same thickness, the strands 11 being thinner than the strands 8, 10 and there being a rapid thickening at 13. In addition, there are slightly thicker portions 14 in the crotches at the corners of the second mesh opening 5, although all these crotches are still relatively highly orientated in the direction running around the crotch.

FIGS. 4a to 8b show starting materials and uniax mesh structures made therefrom, the contouring of the uniax mesh structures being indicated with shading. No detailed description is necessary. The effect of having the slot hole 3 E-W in FIG. 5a is to have a more marked zone 7 in the uniax structure (FIG. 5b). This could be advantageous if a biax structure is being formed.

In order to form biax structures, it is not necessary that a structure like the uniax structures of FIGS. 1b or 2b be formed. The biax structure of FIG. 2c is formed by the route shown because full N-S relaxation was permitted during the second (E-W) stretch. Furthermore, there was some E-W contraction during the first (N-S) stretch, which enabled higher stretch ratios to be applied. In production, it would be more convenient to carry out the first stretch (N-S) in the MD and the second stretch (E-W) in the TD. This would give substantially full restraint.

It has been noted that even with pronounced thickenings or tear blockers in the zones 7 (FIG. 2b), there is a danger that in some circumstances the E-W stretch can pull the second strands 10 right apart and split the first strands 8 up their middle. This difficulty can be avoided using the starting material 1 of FIG. 2a. According to the overall stretch ratio applied, the orientation can pass right down the sides of the secondary holes or depressions 3, or just reach the secondary holes or depressions 3, or cause the second strands 10 to be only partly pulled out, or even stop short of the second strands 10 so that they are not formed. The latter two possibilities can enable a good biax mesh material to be produced, although the stretching is not balanced (more E-W than N-S). The unbalance can be somewhat corrected by a further N-S stretch.

Better control can however be provided if the E-W pitching of the primary holes or depressions 2 is smaller, as shown in FIG. 9a. The reduced E-W pitch prevents the first strands 8 disturbing the E-W bar because the first strands 8 are too narrow to pull out the zones indicated as y. The material itself therefore imposes a limit to the overall stretch ratio on the first strech, but good biax structures (rather like those of FIG. 3c) can be formed on the second stretch. The area stretch ratio is reasonably good. For instance, the overall stretch ratios on the first and second stretches can be 3:1 and 7:1 respectively, giving an area stretch ratio of 21:1. For some applications, the lack of balance in the biax structure is desirable.

FIGS. 10a and 10b correspond to FIGS. 9a and 9b, but in the case of FIG. 10a, the distance y has been reduced by having slots for the secondary holes or depressions 3. Though not shown, this would enable the effect of FIG. 9a to be achieved even with a larger E-W pitching of the primary holes or depressions 2.

FIGS. 11a to 15b show starting materials which are designed for uniax structures and the uniax structures. These need not be described in detail. However, they illustrate that third holes or depressions 15 can be placed between adjacent primary holes or depressions 2 in the same row, in effect dividing each first strand 8 for part of its length into at least two side-by-side portions 16 which extend in the N-S direction.

FIGS. 16a to 21b illustrate starting materials which are primarily for forming uniax mesh structures, and the uniax mesh structures formed from those starting materials. The Figures need not be described in detail. However, in general, the bar between the secondary holes or depressions 3 is weakened or reduced in mass by further holes 17. In effect, the bar stretches N-S, the further holes or depressions 17 forming further mesh openings 18. In this case, each interconnecting portion 6, 9 merges with only two second strands 10, the second strands 10 forking from two adjacent first strands 8 in the same E-W row, the interconnecting portion 6,9 having on one side a first mesh opening 4 and on the other side the further mesh opening 18. The interconnecting portion 6, 9 is generally aligned in the N-S direction with the first mesh opening 4 and the further mesh opening 18. In this particular case, a recess 17 is preferably formed, and a membrane can be left in the further mesh opening 18. It would be seen that each interconnection portion 6,9 is connected on one side with the respective interconnecting portion 6,9 of the next E-W row by means of two generally parallel, orientated third strands 19 extending in the N-S direction. The second and further mesh openings 5, 18 are in E-W rows, each such row having alternating second and further mesh openings 5, 18. The second and further mesh openings 5, 18 are separated by respective further strands 19.

The starting material of FIG. 19a illustrates that the secondary hole or depression need not be in the centre, and can be divided, two secondary holes or depressions 20 being shown in the middle of the group of four primary holes or depressions 2. The second mesh opening is likewise divided into two, shown as 21 in FIG. 19b.

Figure 4A:
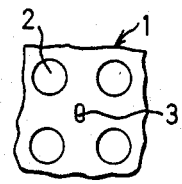
Figure 4B:
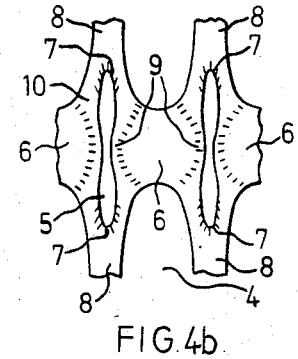
Figure 5A:
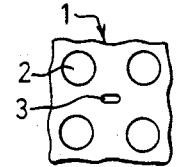
Figure 5B:
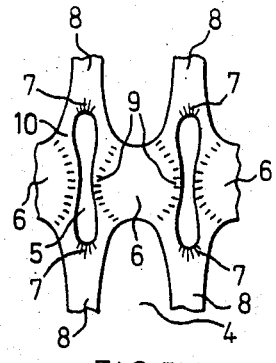
Figure 6A:
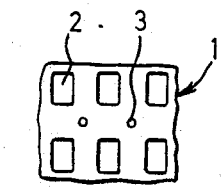
Figure 6B:
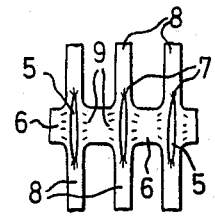
Figure 7A:
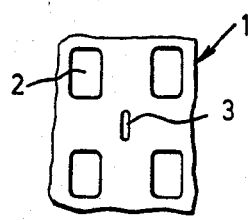
Figure 7B:
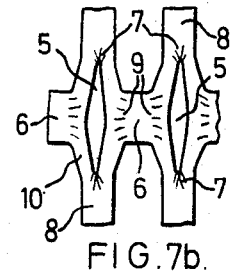
Figure 8A:
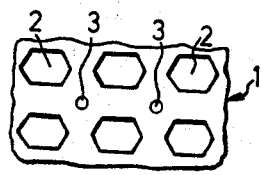
Figure 8B:
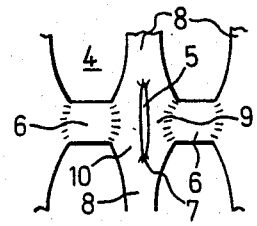
Figure 20A:
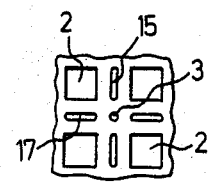
Figure 20B:
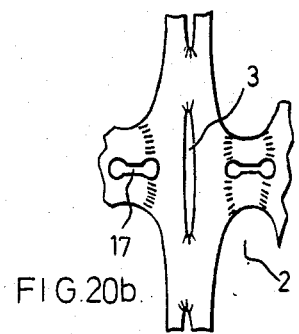
Figure 21A:
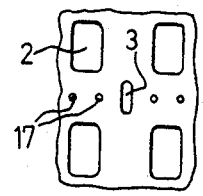
Figure 21B:
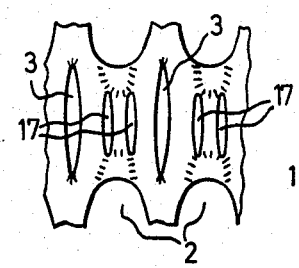

In the complex starting material of FIG. 20a, the hole 3 would be as shown, or could be somewhat bigger or could be a slot aligned N-S as in FIG. 4a or aligned E-W as in FIG. 5a.

Table

The following Table gives details of the production of five different uniax square form structures. Structure 1 is in accordance with GB No. 2 073 090A, whereas structures 2 to 5 are respectively in accordance with FIGS. 4b, 5b, 2h and 2b described above. In each case the holes (structure 1) or the primary holes 2 (structures 2 to 5) in the starting material passed right through the starting material, were circular and were on a square grid with a pitching in each direction equal to double the diameter. The diameter of all the holes was 12.7 mm. In the case of structures 2 to 5, the secondary hole 3 passed right through the starting material and its centre was equidistant from the centres of the primary holes 2 around it. The length of the major axis of the slot-shaped secondary hole of structures 2 and 3 was 6.3 mm. The length of the minor axis of the secondary holes 3 of structures 2 and 3 and the diameter of the secondary holes 3 of structures 4 and 5 was 3.175 mm. All the starting materials were stretched at 99° C. The relative stiffness (in gigaPascals=Newtons/m$^2 \times 10^9$) was calculated at 40% of peak load, and corresponds approximately to Young's modulus. N are Newtons, KN are kiloNewtons. T,0250

The Table illustrates the superiority of the structures of the invention over those of GB No. 2 073 090A. The good properties of structure 5 are believed to be due to orientating the second strands 10 to substantially the same degree as the first strands 8. In general terms, the primary holes 2 were on a square grid at 2w pitch and of width (E-W) and length (N-S) w. The secondary holes 3 were significantly smaller, having a width and length of w/4.

Diamond Form Starting Materials and Structures

Figure 22A:
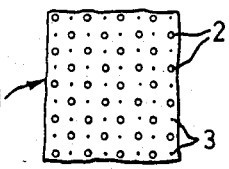
FIGS. 22a to 22c show schematically three stages in the production of a biax diamond form mesh structure in accordance with the invention, forming a uniax mesh structure as an intermediate product.
Figure 22B:
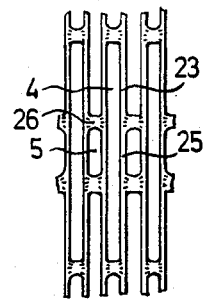
Figure 22C:
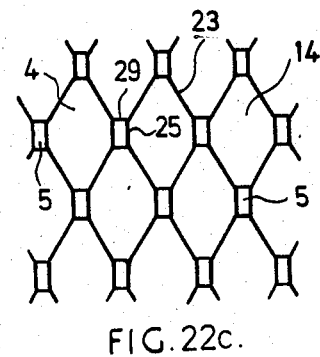

For FIGS. 22a to 22c, the starting material 1 has a pattern of primary and secondary holes or depressions 2, 3 of diamond form. The starting material 1 (see FIG. 23a) is initially stretched in the N-S direction, producing the structure of FIG. 23b where the inclined zones 22 (i.e. on the diagonals) between the initial primary holes or depressions 2 have been stretched out into long, first strands 23. The N-S zones 24 between the secondary holes or depressions 3 adjacent primary holes or depressions 2 have been stretched out into short, second strands or ribs 25, interconnected by thicker zones or blobs 26 of unorientated material which originally lay in the zones 27 between the secondary holes or depressions 3 and the adjacent aligned primary holes or depressions 2 in the N-S direction. However, there is a band of orientated plastics material which passes from one strand 23, along the end or edge 28 of the interconnecting junction containing the blob 26, along the second strand 25, and so on.

In general terms, the uniax diamond form structures have orientated first strands 23, E-W rows of generally parallel, spaced, orientated second strands 25, each second strand 25 extending in the N-S direction, the respective second strands 25 of alternate E-W rows being generally aligned with one another. There are also E-W rows of interconnecting portions 26, 28 which comprise unorientated zones 26 or zones 26 which are substantially less orientated than the mid-points of the first strands 23. The interconnecting portions 26, 28 merge with the ends of pairs of adjacent second strands 25 in any E-W row of second strands 25. Pairs of adjacent second strands 25 in the same E-W row interconnect the E-W ends of two aligned interconnecting portions 26, 28 in adjacent E-W rows. The second mesh openings 5 are each bounded by two interconnecting portions 26, 28 and two second strands 25. The second mesh openings 5 are in E-W rows. The second mesh openings 5 of alternate E-W rows are generally aligned with one another in the N-S direction. The respective second mesh openings 5 of successive E-W rows are staggered, as considered in the N-S direction. The respective ends of each first strand 23 merge with the E-W ends 28 of two adjacent interconnecting portions 26, 28 of adjacent E-W rows, which interconnecting portions 26, 28 are staggered as considered in the N-S direction (see FIG. 22b). The zone where the first strand 23 merges with a particular end 28 is close to the zone where the aligned second strand 25 merges. The first mesh openings 4 are bounded by two pairs of first strands 23, a pair of second strands 25 in the same E-W row, four interconnecting portions 26, 28 from adjacent E-W rows and two interconnecting portions 26, 28 from the next E-W rows on either side of the first-mentioned E-W rows of interconnecting portions 26, 28. Subsequently, the structure of FIG. 22b or 23b can be stretched in the E-W direction the blobs 26 being stretched out into further short strands 29 (FIGS. 23c and 23e with orientated material running all the way round the secondary openings or recesses 5, as well as all the way round the first mesh openings 4 (see FIG. 23e). If desired, the strands 29 can be stretched to the same stretch ratio (on the strands) as that for the strands 25. It is preferred that the two dimensions indicated by arrows in FIGS. 23a and 24a should be approximately equal, to produce strands 25, 29 of approximately equal length.

Figure 24A:
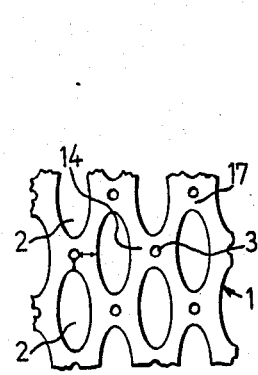
Figure 24B:
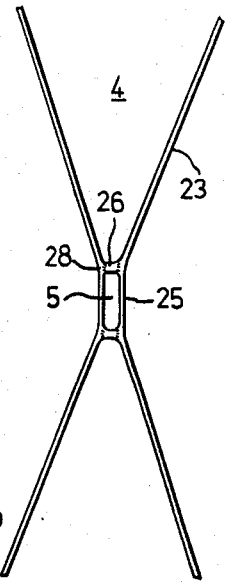
Figure 24C:
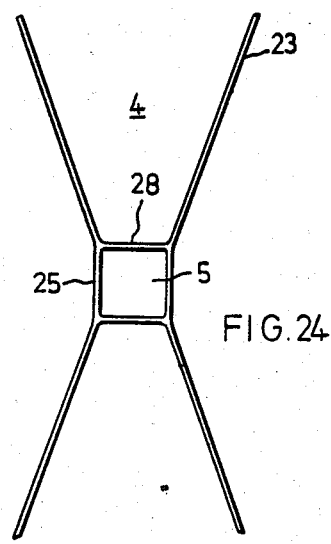

FIGS. 24a to 27b illustrate further diamond form starting materials and uniax mesh structures produced therefrom, as well as some biax mesh structures produced therefrom. These need not be described in detail. In FIGS. 24a, 25a and 26a, the primary holes or depressions 2 in the starting material 1 have a substantially greater N-S direction than the E-W direction, the primary holes or depressions 2 being elliptical in FIGS. 24a and 25a.

General

In general terms, the holes or depressions in the starting material can be of any suitable shape, and suitable shapes are disclosed hereafter. The holes or depressions which are to form the second mesh openings can be extremely small or even be simple piercings with the sides of the holes touching in the starting material. The appearance of the stretched structure will depend upon the shape, size, pitch and pattern of the holes or depressions, upon the thickness of the starting material and upon the stretch ratios. It will be noted that the first and second strands could be of equal length, but that it is preferred to have the second strands shorter than the first strands.

Figure 25A:
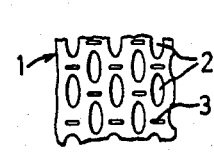
Figure 25B:
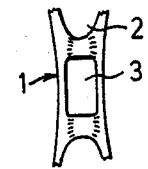

FIG. 28 shows examples of shapes of holes or depressions that can be used. For diamond forms, one can have elliptical or oblong primary holes or depressions 2 and circular secondary holes or depressions 3, as shown in FIGS. 24a or 25a, the major axes of the ellipses being parallel to the major dimensions of the starting material; this avoids wasting material and enables the starting material to be narrower. Rounded ends or corners on the holes or depressions improve the radiussing of the crotches between adjacent strands at the junctions. To produce second strands of substantially equal length and orientation, each secondary hole or depression 3 in the starting material preferably has its periphery substantially the same distance from the periphery of each of the four nearest primary holes or depressions 2. If there are third holes or depressions 15 present or further holes or depressions 17 present, these can have any suitable shape, e.g. as shown in FIG. 28. In addition to the orientation shown in FIG. 28, the shapes can be turned through 45° or 90°.

Various hole or depressions sizes can be used. The holes or depressions preferably occupy substantially less than 50%, and more preferably less than 25%, of the plan view area of the starting material.

In the specific case of the circular holes shown in FIGS. 1a and 5a, in 4.5 mm thick HDPE, the larger or primary holes 2 can be of 6 mm diameter at 12 mm square pitch, the smaller or secondary holes 3 being of for instance 3 mm diameter or width or 2 mm diameter or width. For the formation of the holes, punching is preferred. If the starting material is tubular, it can be punched in flat form as a "lay-flat" tube. However holes or depressions can be formed by continous casting or embossing or obturating, though it is difficult to achieve accuracy.

The starting material can have holes 2, 3, 15, 17 which form open meshes in the final structure, or can have depressions 2, 3, 15, 17 forming contained membranes which rupture on stretching so that open meshes are again formed in the final structure. Alternatively, at least the depressions 3 which are to form the second mesh openings, can be arranged such that they do not rupture right through, leaving a membrane in the final structure. In such cases, it is preferred that the membrane should be mid-way between the two faces. The mesh structures are preferably substantially uniplanar, and in general a uniplanar starting material will form a uniplanar product when stretched in accordance with the invention.

In general, but particularly in the case of intermediate structures where unorientated or less orientated material will normally be present in the junctions, it is highly desirable, at least for thin materials, that at each junction, the thickness of each strand is equal to or greater than its width, as this provides a tear block, to reduce tearing or splitting at or from the junction, the dimensions being measured either where the strand passes into the junction or at the mid-point of the strand.

In general terms, it would be possible to carry out both stretching operations simultaneously. Nonetheless, the preferred way of carrying out the stretching is to perform it in two sequential stages while not allowing the structure to decrease in size along the direction normal to the stretching operation. It is believed that, in theory, it does not matter whether the first stretching operation is carried out in the transverse direction or in the machine direction in a continuous plant, but in practice the first stretching operation is preferably carried out in the machine direction.

FIG. 29 shows that, for instance for fishing nets or garden nets, a substantially straight selvedge can be provided by forming a wavy edge 30 on each margin of the starting material. In this way, the selvedges do not start to stretch before the strands and are not over-stretched, thus avoiding breakage and also applying to the selvedge a lower stretch ratio than that of the strands.

The starting material is preferably not substantially orientated, though melt flow orientation can be present. The starting material can be in flat form or tubular. The preferred starting material is strictly uniplanar, by which is meant that, ignoring any membrane (which may not lie on the median plane, all zones of the starting material are symmetrical about the median plane of the starting material. However, insubstantial departures from uniplanarity are not excluded.

The starting material can have any suitable thickness, though in general terms a range of 0.125 to 12.5 mm is preferred, a narrower preferred range being 0.75 to 6 mm. The starting material can be any suitable plastics material, such as for instance HDPE, low density polyethylene, PP, copolymers of HDPE and PP, and polyamides.

In general, substantially all of that part of the starting material which is being subjected to the stretching forces would be substantially at the same temperature. The stretching is carried out at a temperature above the second order transition temperature of the plastics material but substantially below the softening point. For example, for HDPE, the preferred temperature range is 95°–110° C. and for PP, the preferred temperature range is 98°–120° C.

The starting material can have a skin on each face containing an ultra-violet stabiliser. To enable the mesh structure to be used for laminating, whether to one or more like mesh structures or to one or more different materials such as fabric or film, the starting material may have a special layer on one or both faces. This layer may be of a substance such as low density polyethylene or ethylene viRyl acetate which melts or becomes tacky at a temperature at which the main component of the structure would not de-orientate. The layer or layers could be produced by extrusion coating or coextrusion.

After stretching, the structures can be annealed in a manner well known.

Although only three strands may meet at all the junctions in the bulk of a biax structure, there may be some junctions at which more than three strands meet.

Retaining or Stabilising Particulate Material

Structures generally in accordance with the invention can be used for retaining or stabilising particulate material of any suitable form, such as soil, earth, sand, clay or gravel, and in any suitable locations, such as on the side of a cutting or embankment, beneath a road surface, runway surface or railway track, beneath a building or beneath a quay; it is considered that the structure may be suitable for preventing retaining walls being forced out of position by the pressure of particulate material behind them. Retaining is a specific instance of stabilising.

Figure 23A:
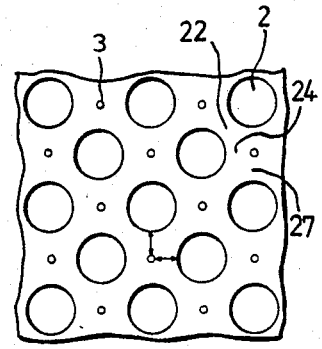
Figure 23B:
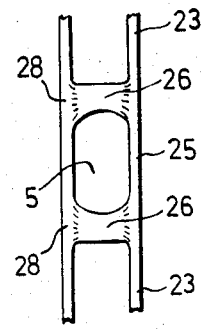
Figure 23C:
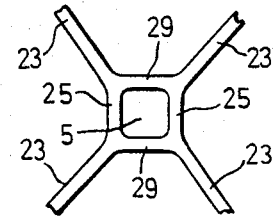
Figure 23D:
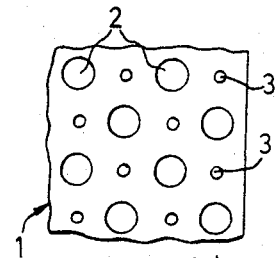
FIG. 23d shows a slightly different starting material and FIG. 23e shows a second mesh opening of the structure, on a yet larger scale.
Figure 23E:
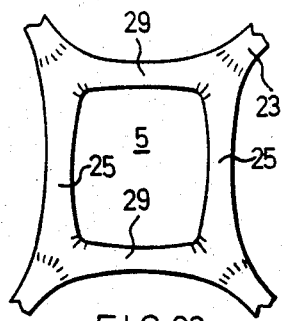

The preferred structure for retaining or stabilising is the uniax square form structure, e.g. of FIGS. 2a or 2b, or uniax diamond form structure, e.g. of FIGS. 23a or 23b, though other structures could be used.

The mesh structure will normally be placed roughly parallel to the surface of the particulate material, e.g. horizontally below a roadway or inclined if near an embankment or cutting surface—see FIG. 30 which shows layers of mesh structure 31.

Asphalt Reinforcement

FIG. 31 shows a road having an asphalt layer: (aggregate mixed with asphalt) 32 over lying a substructure 33. The asphalt layer 32 contains a single layer of uniax mesh structure 34 in accordance with the invention, with its E-W direction (direction of higher orientation) transversely of the road. The mesh openings must be large enough for the asphalt-coated aggregate to lock through, e.g. up to 70×120 mm in size, and the second mesh openings are preferably likewise sufficiently large.

Composite Concrete or Cement Structures

FIG. 32 shows a mass 34 of concrete or cement having therein layers of mesh structure 35 in accordance with the invention. As for asphalt reinforcement, the mesh openings in a biax structure should be sufficiently large for the aggregate to lock through; however uniax structures can be used and are preferred in some circumstances.

I claim:

1. An integral plastics material mesh structure which has been formed by stretching a starting material having a thickness of at least 0.75 mm, the structure having a pattern of generally octagonal first openings and second openings which are substantially smaller than the first openings, each opening being bounded essentially by a plurality of orientated strands which are interconnected at respective junctions at each of which only three strands meet, and the crotches between the strands at the junctions being orientated in the direction running around the crotch.

2. The structure of claim 1, wherein at least one of said crotches, although being orientated in the direction passing around the crotch, comprises a zone of plastics material which is substantially less orientated than the mid-points of the strands meeting at that crotch.

3. An integral plastics material mesh structure which has been formed by stretching a starting material having a thickness of at least 0.75 mm, the structure comprising:

rows of generally parallel, spaced, orientated first strands, substantially each first strand extending generally in a first direction and said rows extending generally in a second direction at right angles to said first direction, the first strands of one row being generally aligned with the respective first strands of the next row;

orientated second strands, each end of each first strand forking into a pair of second strands; and rows of interconnecting portions comprising either unorientated zones or zones which are substantially less orientated than the mid-points of the first strands, said rows of interconnecting portions extending generally in said second direction, each interconnecting portion being generally aligned in said first direction with a first opening formed between two first strands, and the respective ends, in said second direction, of the interconnecting portions merging with the ends, in said first direction, of two second strands which fork from two adjacent first strands of the same row, the respective ends of each interconnecting portion also being connected to two second strands which in turn fork from the first strands of the next row of first strands;

the first openings being bounded essentially by two adjacent first strands of the same row, two interconnecting portions of adjacent rows of interconnecting portions and four second strands forking from the ends of the two first strands, and second openings being formed in general alignment with respective first strands in said first direction, bounded in part by a pair of second strands which fork from the end of the same first strand.

4. The structure of claim 3, wherein each interconnecting portion merges with four second strands which in turn fork from two aligned pairs of first strands, each second opening being bounded essentially by a pair of second strands forking from one first strand, a pair of second strands forking from another first strand generally aligned with the first-mentioned first strand in said direction, and the ends of two adjacent interconnecting portions.

5. The structure of claim 3, wherein each interconnecting portion merges with only two second strands, the second strands forking from two adjacent first strands in the same row, the interconnecting portion having on one side, in said first direction, a said first opening and on the other side a third opening, the interconnecting portion being generally aligned in said first direction with the first opening and with the third opening, and wherein each interconnecting portion merges on one side, in said first direction, with two second strands which fork from two adjacent first strands in the same row, and is connected on the other side with the respective interconnecting portion of the next row by means of two generally parallel, orientated third strands extending generally in said first direction, the second and third openings being in rows which extend generally in said second direction, each such row having alternating second and third openings, and the second and third openings being separated by respective third strands.

6. The structure of claim 3, wherein each interconnecting portion has a central zone of plastics material which is unorientated or substantially less orientated than the mid-points of the first strands, with ends, in said second direction, in the form of marginal zones on either side of the central zone which are orientated generally in said first direction, and thereby provide continuous bands of orientated material running right through the structure generally in said first direction, each band comprising a first strand, a second strand, the end of an interconnecting portion, a second strand, a first strand, and so on, there being no abrupt changes in thickness except possibly a thickening where the band is comprised by the ends of the interconnecting portions.

7. The structure of claim 3, wherein the second strands are orientated to substantially the same degree as the first strands.

8. An integral plastics material mesh structure which has been formed by stretching a starting material having a thickness of at least 0.75 mm, the structure, comprising:

orientated first strands;

rows of generally parallel, spaced, orientated second strands, substantially each second strand extending generally in a first direction and said rows extending generally in a second direction at right angles to said first direction, the respective second strands of alternate rows being generally aligned with one another; and rows of interconnecting portions which comprise unorientated zones or zones which are substantially less orientated than the mid-points of the first strands, said rows extending generally in said second direction, and respective ends, in said second direction, of the interconnecting portions merging with ends, in said first direction, of adjacent second strands in any one row, and adjacent second strands in the same row interconnecting the ends, in said second direction, of two interconnecting portions in adjacent rows which are generally aligned in said first direction, thereby forming second openings each bounded essentially by two interconnecting portions and two second strands, the second openings so formed being in rows which extend generally in said second direction, the second openings of alternate rows of second openings being generally aligned with one another in said first direction and the respective second openings of successive rows of second openings being staggered as considered in said first direction, and respective ends, in said first direction, of each strand merging with the ends of two interconnecting portions of adjacent rows of interconnecting portions, which interconnecting portions are staggered as considered in said first direction, thereby forming first openings bounded essentially by two pairs of first strands, a pair of second strands in the same row, the ends of four interconnecting portions from adjacent rows of interconnecting portions and two interconnecting portions from the next rows of interconnecting portions on either side of the first-mentioned rows of interconnecting portions.

9. The structure of claim 7, wherein each interconnecting portion has a central zone of plastics material which is unorientated or is substantially less orientated than the mid-points of the first strands, with ends, in said second direction, in the form of marginal zones on either side of the central zone which are orientated generally in said first direction and thereby provide continuous bands of orientated material running right through the structure generally in said first direction, each band comprising a first strand, the end of an interconnecting portion, a second strand, the end of an interconnecting portion, a first strand, and so on.

10. A method of producing an integral plastics material mesh structure, comprising:
providing a substantially uniplanar plastics starting material which has a thickness of at least 0.75 mm and comprises a regular pattern of primary holes or depressions, and, between the primary holes or depressions, secondary holes or depressions which are substantially smaller than the primary holes or depressions; and
stretching the plastics material to draw out and orientate the zones between adjacent holes of depressions to form orientated strands which are interconnected at respective junctions at substantially each of which only three strands meet, the crotches between the strands at the junctions being orientated in the direction running around the crocth.

11. The method of claim 10, wherein at least one of the crotches between the strands at a junction comprises a zone of plastics material which is substantially less orientated than the mid-points of the strands meeting at that crotch.

12. A method of making an integral plastics material mesh structure, comprising:
providing a substantially uniplanar plastics starting material which has a thickness of at least 0.75 mm and comprises a regular pattern of primary holes or depressions having their centres on a notional, substantially parallelogram grid, and, between the primary holes or depressions, secondary holes or depressions having their centres approximately displaced along a diagonal of the grid by half the distance between two primary holes or depressions which are adjacent in the diagonal sense, said secondary holes or depressions being substantially smaller than said primary holes or depressions; and
stretching the starting material in a single axis stretching operation to draw the material out into a mesh structure comprising orientated strands interconnected by interconnecting portions which comprise unorientated zones or zones which are substantially less orientated than the strands, which mesh structure comprises first openings and second openings.

13. A method of making an integral plastics material mesh structure comprising orientated first strands, orientated second strands and rows of interconnecting portions comprising either unorientated zones or zones which are substantially less orientated than the mid-points of the first strands, said rows extending generally in a second direction, the method comprising:
providing a substantially uniplanar plastics starting material which has a thickness of at least 0.75 mm and has therein a regular pattern of primary holes or depressions, and between the primary holes or depressions, secondary holes or depressions which are smaller than the primary holes or depressions, said holes or depressions occupying less than 50% of the plan view of the starting material; and
stretching the starting material in a first direction substantially at right angles to said second direction in a single axis stretching operation to stretch out strand-forming zones between adjacent said primary holes or depressions into first orientated strands comprised in the first-mentioned said orientated strands and to stretch out strand-forming zones between a said primary hole or depression and a said secondary hole or depression into second orientated strands comprised in said first-mentioned orientated strands, leaving said interconnecting portions as thicker portions between said primary holes or depressions in the stretching direction.

14. An integral uniaxially-orientated plastics material mesh structure which has been formed by stretching a starting material having a thickness of at least 0.75 mm, the structure comprising:
rows of generally parallel, spaced, orientated first strands, substantially each first strand extending generally in a first direction and said rows extending in a second direction generally at right angles to said first direction, the first strands of one row being generally aligned with the respective first strands of the next row;
orientated second strands forming forked ends on said orientated first strands forking into a pair of second strands, said second strands extending at least roughly in said first direction; and
interconnecting portions interconnecting side-by-side said first strands by interconnecting pairs of adjacent said second strands, said interconnecting portions consisting essentially of plastics materials which is unorientated or substantially less orientated than the mid-points of said first strands, said interconnecting portions being substantially aligned in rows extending in said second direction at right angles to said first direction, thereby forming interrupted bars extending in said second direction, each interconnecting portion being generally aligned in said first direction with a first opening, and respective ends, in said second direction, of the interconnecting portions merging with the ends, in said first direction, of two second strands which fork from two adjacent first strands of the same row, the respective ends of each interconnecting portion also being connected to two second strands which in turn fork from two first strands of the next row of first strands;
the first openings being bounded in part by two adjacent said first strands of the same row, two said second strands forking from the ends of said two adjacent first strands, and a said interconnecting portion with which said two second strands respectively merge, and second openings being formed in general alignment with respective said first strands in said first direction, bounded in part by a pair of said second strands which fork from the end of the same said first strand; continuous bands of highly orientated material running right through the structure generally in said first direction, each said band comprising some of said first strands and some of said second strands.

15. An integral, uniaxially-orientated plastics material mesh structure which has been formed by stretching a starting material having a thickness of at least 0.75 mm, the structure comprising a substantial number of spaced, parallel parts which run substantially right across the structure substantially at right angles to the direction of stretch, said parts comprising at least zones regularly spaced along their lengths which are unorientated or orientated only to a low degree, and said parts being discontinuous and interrupted by regularly-spaced mesh openings, each discontinuous length so formed being connected to the adjacent discontinuous length of the same said part by at least two highly orientated strands whose axes are inclined to each other but which extend generally in the direction of stretch, and each of which highly-orientated strands has one end connected to a respective said discontinuous length and the other end connected to the other highly-orientated strand at a junction, said junctions of said discontinuous parts being connected to said junctions of adjacent said discontinuous parts, by highly-orientated interconnecting strands extending generally in the direction of stretch, there being in the structure first openings bounded in part by two said highly orientated strands whose ends are connected to respective adjacent said junctions, and two adjacent said discontinuous lengths connected to respective said two highly orientated strands, and second openings being formed in general alignment with said junctions in said direction of stretch, bounded in part by a pair of said highly orientated strands which fork from the same said junction.

16. A method of producing an integral plastics material mesh structure, comprising:

providing a substantially uniplanar plastics starting material which has a thickness of at least 0.75 mm and comprises a regular pattern of primary holes or depressions and secondary holes or depressions which are between the primary holes or depressions and are substantially smaller than the primary holes or depressions;

stretching the material in a first direction to stretch out strand-forming zones between adjacent primary holes or depressions into orientated strands and to stretch out strand-forming zones between a primary hole or depression and a secondary hole or depression into orientated strands, leaving thicker, substantially unorientated portions between the primary holes or depressions in the stretching direction; and stretching the material in a second direction at right angles to the first direction, to stretch out the thicker, substantially unorientated portions into further orientated strands, thereby forming a structure in which the orientated strands are interconnected at respective junctions at which only three strands meet.

17. The method of claim 16, wherein the secondary holes or depressions are non-circular, having two opposite sides whose major parts extend generally at right angles to said first direction.

18. The method of claim 17, wherein the secondary holes or depressions also have two further opposite sides whose major parts extend generally in said first direction.

19. The method of claim 16, wherein the secondary holes or depressions are generally square.

* * * * *